US012585535B2

(12) United States Patent
Ma et al.

(10) Patent No.: US 12,585,535 B2
(45) Date of Patent: Mar. 24, 2026

(54) HARDWARE FAULT DETECTION METHOD FOR INTERNAL MEMORY, APPARATUS, AND INTERNAL MEMORY CONTROLLER

(71) Applicant: Huawei Technologies Co., Ltd., Shenzhen (CN)

(72) Inventors: Jiantao Ma, Chengdu (CN); Yangbin Diao, Shenzhen (CN); Zheng Tan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/673,518

(22) Filed: May 24, 2024

(65) Prior Publication Data

US 2024/0311233 A1 Sep. 19, 2024

Related U.S. Application Data

(63) Continuation of application No. PCT/CN2022/115593, filed on Aug. 29, 2022.

(30) Foreign Application Priority Data

Nov. 25, 2021 (CN) .......................... 202111415009.5

(51) Int. Cl.
*G06F 11/00* (2006.01)
*G06F 11/10* (2006.01)
(52) U.S. Cl.
CPC ................................ *G06F 11/1044* (2013.01)

(58) Field of Classification Search
CPC . G06F 11/1044; G06F 11/0727; G06F 11/106
See application file for complete search history.

(56) References Cited

U.S. PATENT DOCUMENTS

| | | | |
|---|---|---|---|
| 7,350,101 B1 | 3/2008 | Nguyen et al. | |
| 2009/0044086 A1 | 2/2009 | Craske et al. | |
| 2010/0157671 A1* | 6/2010 | Mokhlesi | G11C 16/3418 |
| | | | 365/185.11 |
| 2014/0040680 A1* | 2/2014 | Takaku | G06F 11/106 |
| | | | 714/54 |
| 2017/0315879 A1* | 11/2017 | Park | G06F 11/1469 |

(Continued)

FOREIGN PATENT DOCUMENTS

| | | |
|---|---|---|
| CN | 107643955 A | 1/2018 |
| CN | 110046061 A | 7/2019 |

(Continued)

*Primary Examiner* — Joseph D Manoskey
(74) *Attorney, Agent, or Firm* — Conley Rose, P.C.

(57) ABSTRACT

A hardware fault detection method includes, after performing error correction on data at a target location in an internal memory and writing corrected data into the target location, the internal memory controller reads first data from the target location. When determining that an error exists in the first data, the internal memory controller reports an error message, where the error message indicates that a hardware fault occurs at the target location. After finding that an error occurs in the data at the target location, the internal memory controller performs the error correction, write-back, and re-reading on the data, to further determine a type of the error occurring at the target location.

20 Claims, 3 Drawing Sheets

(56)     References Cited

U.S. PATENT DOCUMENTS

2017/0344422 A1 *  11/2017  Kwon ................. G06F 11/1048
2021/0294695 A1 *   9/2021  Li ....................... G06F 11/3037
2021/0389956 A1    12/2021  Li et al.
2022/0148674 A1     5/2022  Qiao et al.

FOREIGN PATENT DOCUMENTS

CN        111694691  A      9/2020
CN        113821364  A     12/2021

* cited by examiner

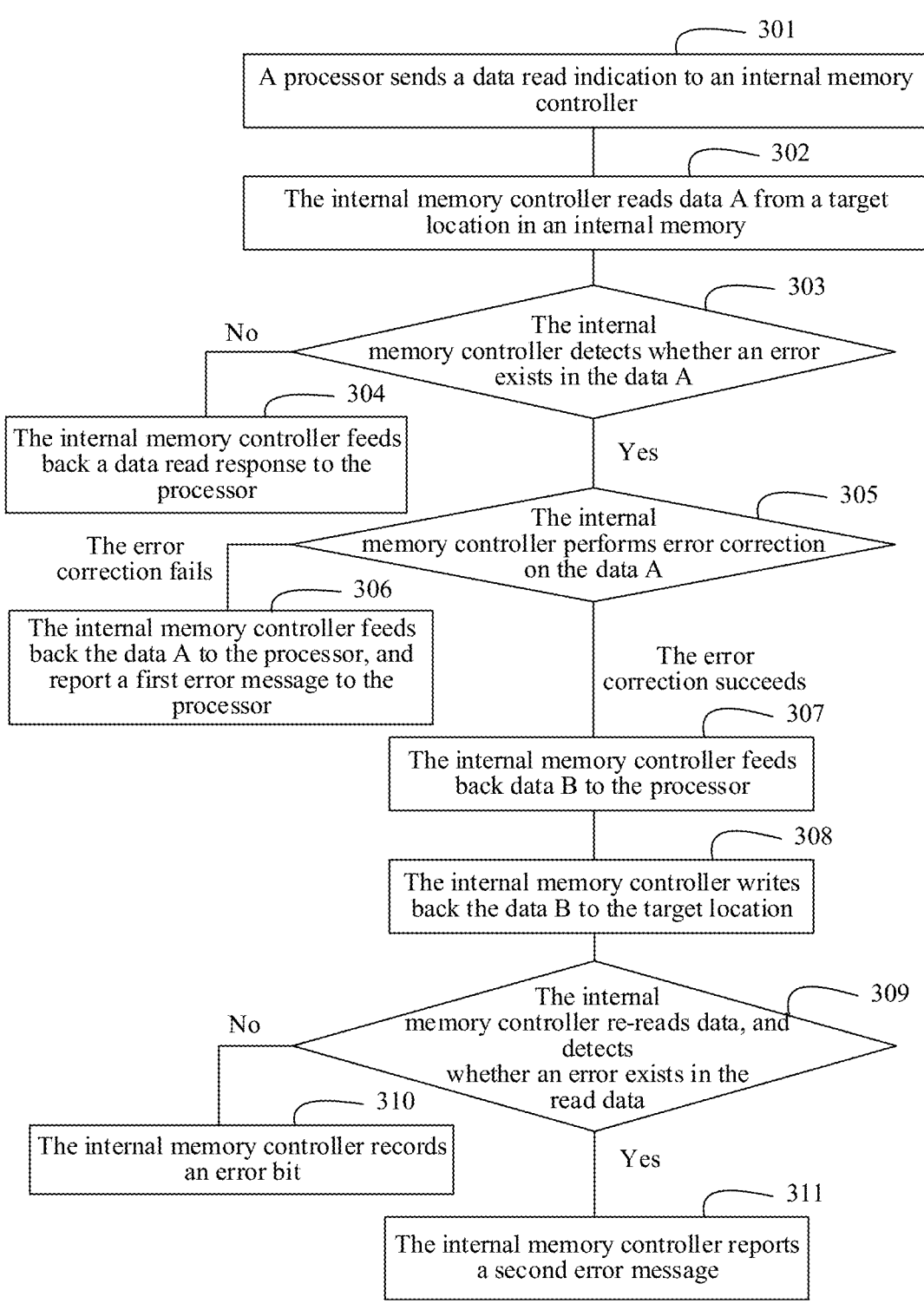

301

A processor sends a data read indication to an internal memory controller

302

The internal memory controller reads data A from a target location in an internal memory

303

The internal memory controller detects whether an error exists in the data A

No

304

The internal memory controller feeds back a data read response to the processor

Yes

305

The internal memory controller performs error correction on the data A

The error correction fails

306

The internal memory controller feeds back the data A to the processor, and report a first error message to the processor The error correction succeeds

307

The internal memory controller feeds back data B to the processor

308

The internal memory controller writes back the data B to the target location

309

The internal memory controller re-reads data, and detects whether an error exists in the read data No

310

The internal memory controller records an error bit

Yes

311

The internal memory controller reports a second error message

| Error correction unit | Reading unit | Processing unit |

— 500

501          503

| Processing module | | Interface |

502

Storage

HARDWARE FAULT DETECTION METHOD FOR INTERNAL MEMORY, APPARATUS, AND INTERNAL MEMORY CONTROLLER

CROSS-REFERENCE TO RELATED APPLICATIONS

This is a continuation of International Patent Application No. PCT/CN2022/115593 filed on Aug. 29, 2022, which claims priority to Chinese Patent Application No. 202111415009.5 filed on Nov. 25, 2021. The disclosures of the aforementioned applications are hereby incorporated by reference in their entireties.

TECHNICAL FIELD

This application relates to the field of storage technologies, and in particular, to a hardware fault detection method for an internal memory, an apparatus, and an internal memory controller.

BACKGROUND

An internal memory (memory) is one of important components of a computer. The internal memory is configured to temporarily store operation data of a processor in the computer and data that is to be exchanged between the processor and an external memory such as a hard disk drive. An internal memory controller, located inside the computer, is configured to manage the internal memory, and is responsible for data exchange between the internal memory and the processor.

When reading data based on an indication of the processor, the internal memory controller may check the read data, and determine whether an error occurs in the data. If the error occurs in the read data, the internal memory controller reports the error to the processor. The processor performs decision processing, for example, may give an alarm, perform reset, or the like.

However, the error occurring in the read data is usually caused by a soft failure. The error caused by the soft failure is usually temporary. If the internal memory controller frequently reports the error caused by the soft failure, load of the processor is increased, and unnecessary work is increased.

SUMMARY

This application provides a hardware fault detection method for an internal memory, an apparatus, and an internal memory controller, to improve accuracy of reporting an error by the internal memory controller.

According to a first aspect, an embodiment of this application provides a hardware fault detection method for an internal memory, and the method may be performed by an internal memory controller. The internal memory controller may read data from a target location in the internal memory based on an indication of a processor. If it is found that an error occurs in the data, the internal memory controller performs error correction on the data at the target location and writes corrected data into the target location. To further determine a type of the error occurring at the target location, after performing the error correction on the data at the target location and writing the corrected data into the target location, the internal memory controller may read first data from the target location. If determining that an error exists in the first data, the internal memory controller may report an error message, where the error message indicates that a hardware fault occurs at the target location.

According to the foregoing method, after finding that the error occurs in the data at the target location, the internal memory controller performs the error correction, write-back, and re-reading on the data, to further determine the type of the error occurring at the target location, and report error information when it is determined that the hardware fault occurs at the target location. This reduces a case in which the error information is frequently reported due to a soft failure, and improves accuracy of reporting an error by the internal memory controller.

In a possible implementation, there are a plurality of cases in which the internal memory controller performs the error correction on the data at the target location in the internal memory and writes the corrected data into the target location. For example, the processor may initiate the indication to the internal memory controller, to indicate to read data from the target location. After receiving the indication of the processor, the internal memory controller may read second data from the target location. When determining that an error occurs in the second data, the internal memory controller performs error correction on the second data, and writes corrected data into the target location.

According to the foregoing method, the internal memory controller may read data from the target location based on the indication of the processor. After finding that the error exists in the data, the internal memory controller determines, by performing operations such as the error correction, write-back, re-reading, and the like, a type of the error occurring at the target location, to ensure accuracy of a subsequently reported error message.

In a possible implementation, if the internal memory controller finds that no error exists in the first data, it indicates that the error occurring at the target location may be caused by the soft failure. In this case, the internal memory controller may record the target location.

When determining that a quantity of times for which the error caused by the soft failure occurs at the target location exceeds a specific threshold, the internal memory controller may report a soft failure message. The soft failure message indicates that the quantity of times for which the error caused by the soft failure occurs at the target location exceeds the threshold.

According to the foregoing method, for the error caused by the soft failure, the internal memory controller only records the target location, so that frequency of reporting the error message can be reduced to some extent.

In a possible implementation, when reading the first data from the target location in the internal memory, the internal memory controller may perform read isolation configuration on the target location. The read isolation configuration may shield a read operation performed on the target location by a component other than the internal memory controller. When the read isolation configuration is performed, the internal memory controller reads the first data from the target location in the internal memory. After the first data is read, the read isolation configuration may be cancelled.

According to the foregoing method, the read isolation configuration is performed on the target location before the first data is read, and the read isolation configuration is canceled after the first data is read. This can reduce a case in which another component reads the first data in which an error exists.

In a possible implementation, when writing the first data into the target location, the internal memory controller may perform write isolation configuration on the target location.

The write isolation configuration is used to shield a write operation performed on the target location by a component other than the internal memory controller. After writing the first data into the target location, the internal memory controller may cancel the write isolation configuration.

According to the foregoing method, the write isolation configuration is performed on the target location before the first data is written, and the write isolation configuration is canceled after the first data is written. This can reduce a case in which another component modifies the first data in which an error exists.

In a possible implementation, before reporting the error message, the internal memory controller may perform the error correction, the write-back, and the re-reading on the first data for a plurality of times. When determining that an error still exists in re-read data, the internal memory controller may determine that the hardware fault occurs at the target location.

According to the foregoing method, the error correction, the write-back, and the re-reading are performed for the plurality of times, to accurately determine the type of the error occurring at the target location.

According to a second aspect, an embodiment of this application further provides a fault detection apparatus. The fault detection apparatus has functions of implementing behavior in the method instance according to the first aspect. For beneficial effects, refer to the descriptions of the first aspect. Details are not described herein again. The functions may be implemented by hardware, or may be implemented by hardware executing corresponding software. The hardware or the software includes one or more units corresponding to the functions. In a possible design, a structure of the fault detection apparatus includes an error correction unit, a reading unit, and a processing unit. These units may perform corresponding functions in the method example according to the first aspect. For details, refer to the detailed descriptions in the method example. Details are not described herein again.

According to a third aspect, an embodiment of this application further provides an internal memory controller. The internal memory controller has functions of implementing the behavior in the method instance according to the first aspect. For beneficial effects, refer to the descriptions of the first aspect. Details are not described herein again.

In a possible implementation, a structure of the internal memory controller may include a processing module and a storage. The processing module is configured to support the internal memory controller to perform a corresponding function of the internal memory controller in the method according to the first aspect. The storage is coupled to the processing module, and stores program instructions and data for the network interface card. The internal memory controller may further include an interface, where the interface is configured to communicate with another component or apparatus, for example, receive an indication of a processor, and the like.

In another possible implementation, a structure of the internal memory controller may alternatively include a processing module and an interface. The internal memory controller is configured to support the internal memory controller to perform a corresponding function in the method according to the first aspect. The processor may further perform communication through the interface, for example, receive an indication of the processor, and the like.

According to a fourth aspect, this application further provides a computer-readable storage medium. The computer-readable storage medium stores instructions. When the instructions are run on a computer, the computer is enabled to perform the method according to the first aspect and the possible implementations of the first aspect.

According to a fifth aspect, this application further provides a computer program product including instructions. When the computer program product runs on a computer, the computer is enabled to perform the method according to the first aspect and the possible implementations of the first aspect.

According to a sixth aspect, this application further provides a computer chip. The chip is connected to a storage, and the chip is configured to read and execute a software program stored in the storage, to perform the method according to the first aspect and the possible implementations of the first aspect.

BRIEF DESCRIPTION OF DRAWINGS

FIG. 3 is a schematic diagram of a hardware fault detection method for an internal memory according to an embodiment of this application;

DESCRIPTION OF EMBODIMENTS

Figure 1:
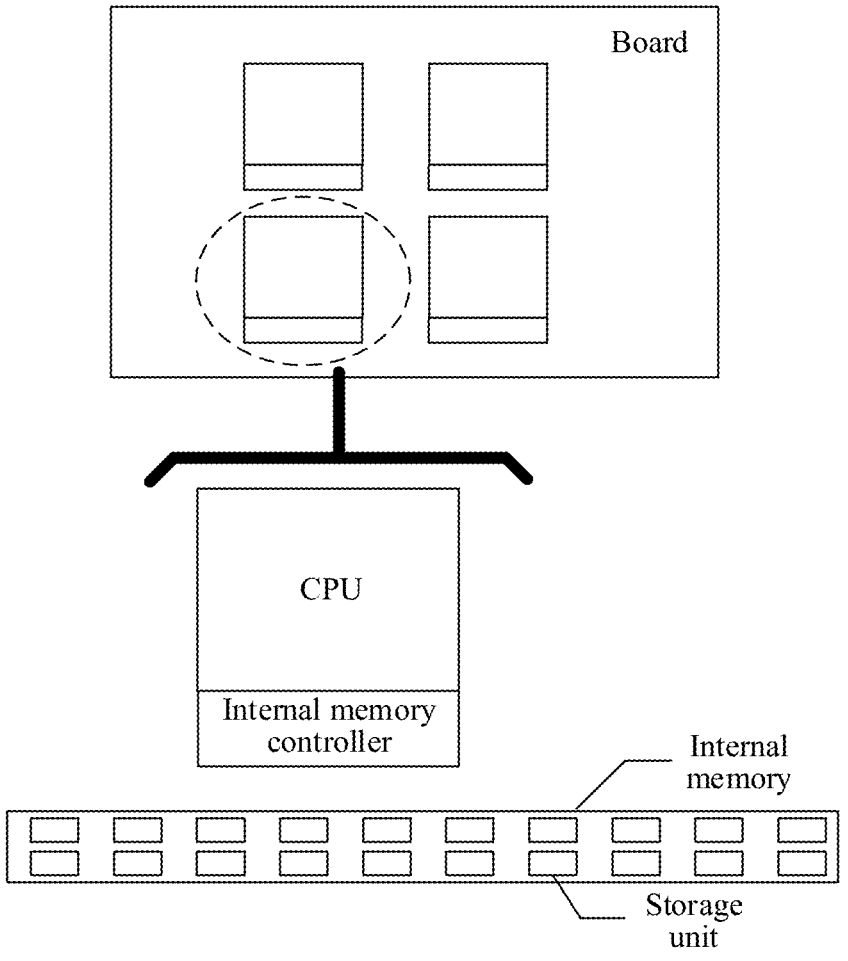
FIG. 1 is a schematic architectural diagram of a board.

FIG. 1 is a schematic diagram of a board in a computer. A central processing unit (CPU), an internal memory controller, and an internal memory may be deployed on the board in the computer.

The internal memory may temporarily store data that may need to be operated by a processor or data obtained from an external memory (such as a hard disk drive) of the computer. The internal memory includes a plurality of storage units. Each storage unit includes one transistor and one capacitor. A state of the capacitor determines that data stored in the storage unit is 0 or 1.

The internal memory controller can control the internal memory to implement data exchange between the internal memory and the CPU. When the CPU may need to read data from the internal memory, the CPU may initiate an indication to the internal memory controller, to request the internal memory controller to read the data from the internal memory. After reading the data from the internal memory, the internal memory controller checks the read data. If the data check succeeds, the internal memory controller feeds back the data to the processor. If the data check fails, it indicates that error data exists. The internal memory controller may perform error correction on the error data. If the error correction succeeds, the internal memory controller may feed back corrected data to the processor.

Currently, error checking and correction (ECC) is an error checking and correction algorithm applicable to an internal memory, a cache, or another storage medium.

An example in which the internal memory controller runs the ECC is used. When the internal memory controller may need to write data into the internal memory, the internal memory controller calculates check code based on the to-be-written data, and writes both the data and the check code of the data into the internal memory.

When the internal memory controller may need to read the data from the internal memory, the internal memory controller also reads the check code in the internal memory when reading the data from the internal memory. The internal memory controller may recalculate a check code by using the obtained data. The internal memory controller compares the check code read from the internal memory with the recalculated check code. If the check code read from the internal memory and the recalculated check code are consistent, it indicates that the data is normal and the check succeeds. If the check code read from the internal memory and the recalculated check code are inconsistent, it indicates that the data is incorrect, an error occurs in the data, and the check fails. If the check fails, the internal memory controller may perform error correction on the read data.

Data errors are classified into a correctable error (CE) and an uncorrectable error (UCE).

The CE usually means that a single-bit data error exists in data. The internal memory controller can detect, through check, a bit that is in the data and in which an error occurs, and an error correction effect can be achieved by inverting the bit in which the error occurs. A part of correctable errors occurring in the internal memory do not occur repeatedly on a fixed location. In other words, this type of CE is temporary, and may usually be considered to be caused by a soft failure. The soft failure means that, when high-energy subatomic particles pass through a storage unit in the internal memory, free charges are generated at the same time. These free charges accumulate in a circuit node inside the storage unit in a very short interval. When the free charges are accumulated more than a specific degree, data stored in the storage unit changes, causing a data error. The soft failure does not permanently damage a circuit in the storage unit. When data obtained through correction is written back to the internal memory, the data error can be recovered.

The UCE usually means that a multi-bit error exists in data. For the UCE, the internal memory controller cannot perform error correction on such error. Generally, it is considered that the UCE is caused by a hardware fault of the storage unit in the internal memory, such as a transistor or capacitor breakdown in the storage unit.

When finding a data error in a process of reading data, the internal memory controller may report the found CE or UCE to the processor. The CPU determines a processing operation on the CE and the UCE. Because the CE is generally correctable, the CPU may only need to record the CE. If a quantity of reported CEs exceeds a threshold, the CPU may trigger a board reset. For the UCE, the CPU may perform a processing operation such as alarm reporting or the board reset.

In an ECC mechanism, the internal memory controller reports all detected CEs and UCEs to the CPU. Consequently, excessive load on the CPU is caused and a large quantity of CPU resources are occupied. If the CPU performs the operations such as the alarm reporting, the board reset, and the like, normal services are also affected.

According to the foregoing descriptions about the CE and the UCE, some CEs caused by the soft failure are temporary and do not need to be reported frequently. To reduce frequency of reporting an error by the internal memory controller to the CPU, embodiments of this application provide a hardware fault detection method for an internal memory. The following describes, with reference to the accompanying drawings, a system, a method, and a device to which embodiments of this application are applied.

Figure 2:
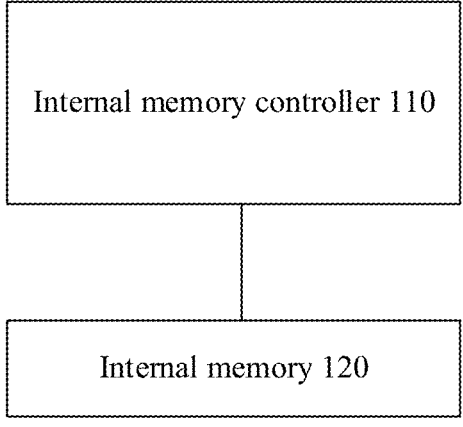
FIG. 2 is a schematic architectural diagram of a system according to an embodiment of this application.

FIG. 2 is a schematic structural diagram of a system according to an embodiment of this application. The system includes an internal memory controller 110 and an internal memory 120.

The internal memory controller 110 is configured to manage the internal memory 120, for example, manage storage space in the internal memory 120, and read data from the internal memory 120 or write data into the internal memory 120.

In this embodiment of this application, the internal memory controller 110 has the following functions.

(1) Detection Function

The internal memory controller 110 can detect the data read from the internal memory 120, to detect error data existing in the data. A manner in which the internal memory controller 110 detects the error data existing in the read data is not limited in this embodiment of this application. For example, the internal memory controller 110 may detect the read data by using an ECC algorithm, or may detect the read data in another manner. Any manner of detecting the error data existing in the data is applicable to this embodiment of this application.

(2) Error Correction Function

If obtaining, through detection, that the error data exists in the data, the internal memory controller 110 may further perform error correction on the data to correct the error data existing in the data, and the internal memory controller 110 may rewrite corrected data into the internal memory 120.

(3) Reporting Function

The internal memory controller 110 can report a data error. A cause of the error data existing in the data is usually that a storage unit storing the data is faulty, for example, a soft failure exists in the storage unit or a hardware fault occurs in the storage unit. In this embodiment of this application, to control reporting frequency of the internal memory controller 110, the internal memory controller 110 does not need to report all detected data errors, but only reports a data error caused by the hardware fault. For example, the internal memory controller 110 may report that a hardware error occurs at a location at which the error data is stored.

The internal memory controller 110 may include a digital signal processor (DSP), an application-specific integrated circuit (ASIC), a field-programmable gate array (FPGA) or another programmable logic device, a discrete gate or a transistor logic device, a discrete hardware component, an artificial intelligence chip, a system on a chip, and the like.

The internal memory 120 may include a volatile memory, for example, a random-access memory (RAM), a dynamic random-access memory (DRAM), and the like, may include a non-volatile memory, for example, a storage-class memory (SCM), and the like, or may include a combination of a volatile memory and a non-volatile memory, or the like.

A deployment location of the system shown in FIG. 2 is not limited in this embodiment of this application. For example, the system may be located in a computer. A processor in the computer may indicate the internal memory controller 110 to write data into the internal memory 120 or read data from the internal memory 120. In a process of reading the data, if a data error caused by a hardware fault is found, the internal memory controller 110 may report error information to the processor, and notify the processor that a hardware fault exists in a location at which the data is stored.

Different from an ECC mechanism, in this embodiment of this application, when the internal memory controller 110 reads data from a location in the internal memory 120, if it is detected that an error exists in the data, the internal memory controller 110 may perform error correction on the data and then write back corrected data to the location. The internal memory controller 110 reads the corrected data from the location again. If determining that an error still exists in the corrected data, the internal memory controller 110 may report an error message. The error message indicates that a hardware fault occurs at the location at which the data is stored. In other words, the internal memory controller 110 no longer needs to report a data error caused by a soft failure, but only reports a hardware fault that significantly affects performance of the internal memory 120. Therefore, frequency of reporting the error message by the internal memory controller 110 is effectively reduced. In addition, the data error caused by the hardware fault can be accurately identified by writing back corrected data and re-reading the corrected data. Therefore, reporting accuracy of the internal memory controller 110 is improved.

The following describes a hardware fault detection method for an internal memory 120 provided in embodiments of this application with reference to FIG. 3.

Step 301: A processor sends a data read indication to an internal memory controller 110, where the data read indication is used to request to read data from a target location. When the processor sends the data read indication to the internal memory controller 110, the data read indication may carry a logical address of the data, and the logical address of the data may indicate the target location in the internal memory 120.

Step 302: After receiving the data read indication, the internal memory controller 110 reads data A from the target location in the internal memory 120. After receiving the data read indication, the internal memory controller 110 may determine a physical address of the data based on a logical address of the data, and read the data A from the target location indicated by the physical address.

Step 303: After reading the data A, the internal memory controller 110 detects whether an error exists in the data A. If no error exists in the data A, step 304 is performed. If the error exists in the data A, step 305 is performed.

For a manner in which the internal memory controller 110 detects whether the error exists in the data, refer to the foregoing descriptions. Details are not described herein again. The internal memory controller 110 may determine, by detecting the data A, whether the error exists in the data A. It should be noted herein that the error exists in the data A means that an error occurs in a part or all of the data in the data A. The data A in which the error exists is different from data A that is to be written into the target location. For ease of description, data in which an error occurs in the data A is referred to as error data.

Step 304: The internal memory controller 110 feeds back a data read response to the processor, where the data read response carries the data A.

Step 305: The internal memory controller 110 performs error correction on the data A. If the error correction fails, step 306 is performed. If the error correction succeeds, step 307 is performed.

If the error data exists in the data A, the internal memory controller 110 may determine the error data in the data A, and may further determine a location at which the error data is stored in the target location. The data A is measured by using a bit, and the location at which the error data is stored may also be referred to as an error bit in this embodiment of this application.

Step 306: The internal memory controller 110 feeds back the data A to the processor, and reports a first error message to the processor. The first error message indicates that an UCE occurs on the error bit or a hardware fault occurs on the error bit.

It should be noted that data errors are classified into an UCE and a CE. However, a specific classification of the data errors is not limited in this embodiment of this application. In some scenarios, a data error caused by the hardware fault may alternatively have another name. A manner in which the first error message indicates the hardware fault is not limited in this embodiment of this application. The first error message may indicate that the hardware fault occurs on the error bit in a direct manner, or may indicate that the UCE (or another data error caused by the hardware fault) occurs on the error bit in an indirect manner.

Step 307: If corrected data A is data B, the internal memory controller 110 feeds back the data B to the processor.

Step 308: The internal memory controller 110 writes back the data B to the target location. When step 308 is performed, the internal memory controller 110 may directly write back the data B to the target location, or may perform data write-back only on the error bit. The internal memory controller 110 may perform the error correction on the error data, and then write back corrected error data to the error bit.

Step 309: The internal memory controller 110 reads data from the target location again, and detects whether an error exists in the read data. In this step, the internal memory controller 110 performs a data re-reading operation. The data re-reading operation is not performed based on an indication of the processor, but is performed by the internal memory controller 110.

When step 309 is performed, the internal memory controller 110 may read all data read by the target location, and detect whether an error exists in the data stored at the target location. Alternatively, the internal memory controller 110 may only read the data stored in the error bit, and detect whether an error exists in the data stored in the error bit.

If no error exists in the read data (where the data may be the data stored at the target location, or may be the data stored in the error bit), step 310 is performed. If the error exists in the read data, step 310 is performed.

Step 310: The internal memory controller 110 records the error bit. If no error exists in the read data, it indicates that a soft failure may occur on the error bit. The error data only occurs temporarily. The internal memory controller 110 may not perform reporting, and only record the error bit.

Step 311: The internal memory controller 110 reports a second error message, where the second error message indicates that the UCE or the hardware fault occurs on the error bit. The corrected error data is written back to the error bit, and then the data is re-read from the error bit. If it is found that an error still exists in the read data, it indicates that the hardware fault exists on the error bit. Consequently, the corrected data is written into the error bit again, and an error still occurs in the data.

An indication manner of the second error message is similar to an indication manner of the first error message. For details, refer to the foregoing descriptions. Details are not described herein again.

In step 308 to step 311, the internal memory controller 110 may determine an error type of the error bit by performing operations such as writing back the corrected error data, re-reading the data from the error bit, and the like, for example, determine that a fault of the error bit is a fault caused by the soft failure or a fault of the error bit is a hardware fault.

When writing back the corrected error data to the error bit or re-reading the data from the error bit, the internal memory controller 110 may perform write isolation configuration on the error bit. The write isolation configuration is used to shield a write operation performed on the error bit by a component other than the internal memory controller 110. The internal memory controller 110 may further perform read isolation configuration on the error bit. The read isolation configuration is used to shield a read operation performed on the error bit by a component other than the internal memory controller 110.

A case in which another component (such as the processor) performs the read or write operation on the error bit in a process of writing back or re-reading the error data is avoided, so that the internal memory controller 110 can accurately determine the error type of the error bit. In addition, a case in which the another component reads the error data from the error bit or an error occurs in the data that is written into the error bit by the another component is avoided.

Herein, an example in which the another component is a processor is used to describe a manner in which the internal memory controller 110 performs the write isolation configuration or the read isolation configuration on the error bit.

The internal memory controller 110 may initiate an indication to the processor, where the indication is used to request to perform write isolation configuration or the read isolation configuration on the error bit. After receiving the indication, the processor may perform write back pressure configuration and read back pressure configuration on the error bit by using a register inside the processor. In this way, even if the processor may need to write or read the error bit, because the register inside the processor performs the write back pressure configuration and the read back pressure configuration on the error bit, the processor does not read or write the error bit via the internal memory controller 110, so that an effect of performing the write isolation configuration or the read isolation configuration on the error bit is achieved.

In the embodiment shown in FIG. 3, an example in which the internal memory controller 110 performs the write-back and re-reading operations on the error bit once is used for description. When determining the error type of the error bit, the internal memory controller 110 may alternatively write back and re-read the error bit for a plurality of times. If it is determined that an error still exists in the data read from the error bit after the write-back or re-reading operations are performed on the error bit for the plurality of times, it may be determined that the hardware fault occurs on the error bit. This ensures accuracy of the error type.

Figure 4:
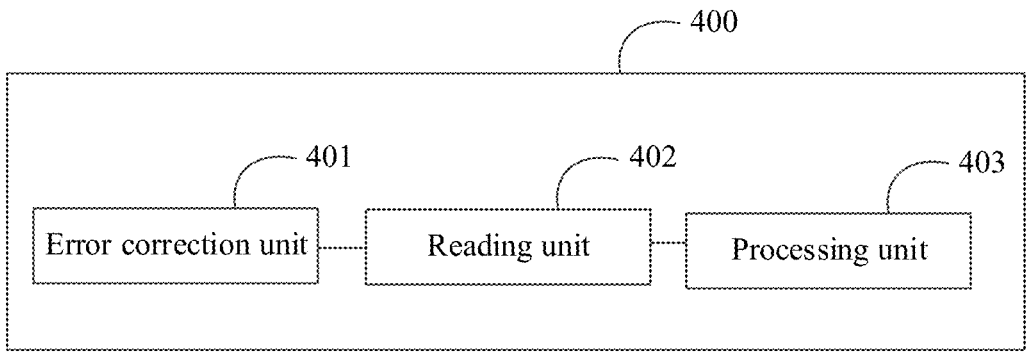
FIG. 4 is a schematic structural diagram of a fault detection apparatus according to an embodiment of this application.

Based on a same concept as the method embodiment, an embodiment of this application further provides a fault detection apparatus. The fault detection apparatus is configured to perform the method performed by the internal memory controller in the method embodiment shown in FIG. 3. For related features, refer to the foregoing method embodiment. Details are not described herein again. As shown in FIG. 4, the fault detection apparatus 400 may be deployed in an internal memory controller. The fault detection apparatus 400 includes an error correction unit 401, a reading unit 402, and a processing unit 403.

The error correction unit 401 is configured to perform error correction on data at a target location in an internal memory and write corrected data into the target location.

The reading unit 402 is configured to: after the error correction unit 401 performs the error correction on the data at the target location in the internal memory and writes the corrected data into the target location, read first data from the target location.

The processing unit 403 is configured to: when it is determined that an error exists in the first data, report an error message, where the error message indicates that a hardware fault occurs at the target location.

In a possible implementation, before the error correction unit 401 performs the error correction on the data at the target location in the internal memory and writes the corrected data into the target location, the reading unit 402 may read second data from the target location based on an indication of a processor. When determining that an error occurs in the second data, the error correction unit 401 may perform error correction on the second data, and write corrected data into the target location.

In a possible implementation, if determining that no error exists in the first data, the processing unit 403 records the target location.

In a possible implementation, before reading the first data, the reading unit 402 may further perform read isolation configuration on the target location. The read isolation configuration is used to shield a read operation performed on the target location by a component other than the internal memory controller. The reading unit 402 reads the first data from the target location in the internal memory, and cancels the read isolation configuration after reading the first data.

In a possible implementation, before writing the first data, the error correction unit 401 may further perform write isolation configuration on the target location. The write isolation configuration is used to shield a write operation performed on the target location by a component other than the internal memory controller. The error correction unit 401 writes the first data into the target location, and cancels the write isolation configuration after writing the first data.

In a possible implementation, before the processing unit 403 reports the error message, the error correction unit 401 may perform the error correction, write-back, and re-reading on the data at the target location for a plurality of times, to accurately determine a type of the error occurring at the target location. For example, the error correction unit 401 may perform the error correction on the first data, and write corrected first data into the target location again. Then, the processing unit 403 reads the corrected first data from the target location, and determines that an error exists in the corrected first data.

It should be noted that in embodiments of this application, division into the units is an example, and is merely logical function division. During actual implementation, another division manner may be used. Functional units in embodiments of this application may be integrated into one processing unit, or each unit may exist alone physically, or two or more units may be integrated into one unit. The integrated units may be implemented in a form of hardware, or may be implemented in a form of a software functional unit.

All or some of the foregoing embodiments may be implemented by software, hardware, firmware, or any combination thereof. When software is used to implement embodiments, all or some of the foregoing embodiments may be implemented in a form of a computer program product. The computer program product includes one or more computer instructions. When the computer program instructions are loaded or executed on a computer, the procedures or functions according to embodiments of the present disclosure are all or partially generated. The computer may be a general-purpose computer, a dedicated computer, a computer network, or another programmable apparatus. The computer instructions may be stored in a computer-readable storage medium or transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be accessed by the computer, or a data storage device, such as a server or a data center, integrating one or more usable media. The usable medium may be a magnetic medium (for example, a floppy disk, a hard disk drive, or a magnetic tape), an optical medium (for example, a digital video disc (DVD)), or a semiconductor medium. The semiconductor medium may be a solid-state drive (SSD).

Figure 5:
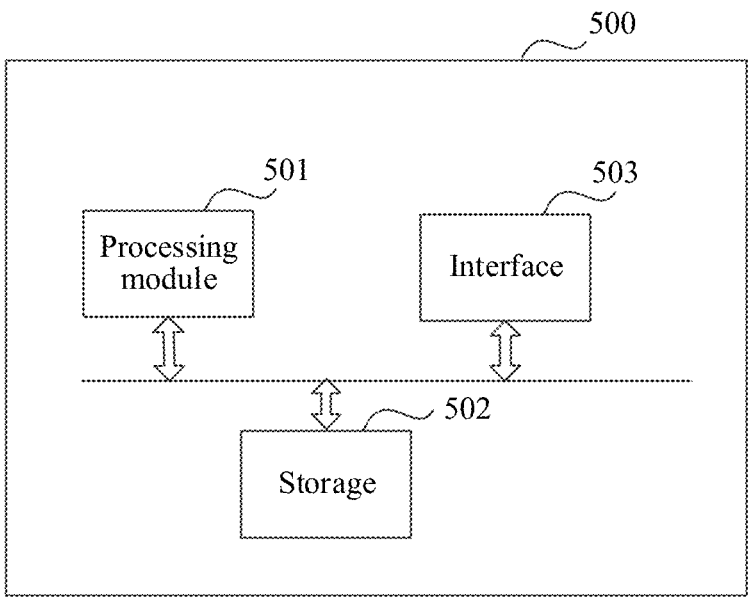
FIG. 5 is a schematic structural diagram of an internal memory controller according to an embodiment of this application.

In a simple embodiment, a person skilled in the art may figure out that the internal memory controller in the embodiment shown in FIG. 3 may be in a form shown in FIG. 5.

For example, an internal memory controller 500 shown in FIG. 5, includes a processing module 501. Optionally, the internal memory controller 500 may further include a storage 502 and an interface 503.

The storage 502 may be a volatile memory, for example, a RAM. The storage may alternatively be a non-volatile memory, for example, a ROM, a flash memory, a hard disk drive (HDD), or an SSD. Alternatively, the storage 502 is any other medium that can be used to carry or store expected program code in a form of an instruction or a data structure and that can be accessed by a computer. However, this is not limited thereto. The storage 502 may be a combination of the foregoing memories.

The processing module 501 may be another general-purpose processor, a DSP, an ASIC, an FPGA or another programmable logic device, a discrete gate or a transistor logic device, a discrete hardware component, an artificial intelligence chip, a system on a chip, or the like. The general-purpose processor may be a microprocessor, another processor, or the like.

When the internal memory controller 500 is in the form shown in FIG. 5, the processing module 501 in FIG. 5 may perform the method performed by the internal memory controller according to the foregoing method embodiment, or may invoke computer-executable instructions stored in the storage 502, to enable the internal memory controller to perform the method performed by the internal memory controller according to the foregoing method embodiment.

Specifically, functions or implementation processes of the error correction unit 401, the reading unit 402, and the processing unit 403 in FIG. 4 may all be implemented via the processing module 501 in FIG. 5.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a compact disc read-only memory (CD-ROM), an optical memory, and the like) that include computer-usable program code.

This application is described with reference to the flowcharts and/or block diagrams of the method, the device (system), and the computer program product according to this application. It should be understood that computer program instructions may be used to implement each procedure and/or block in the flowcharts and/or block diagrams and a combination of a procedure and/or a block in the flowcharts and/or block diagrams. These computer program instructions may be provided for a general-purpose computer, a dedicated computer, an embedded processor, or a processor of another programmable data processing device to generate a machine, so that the instructions executed by the computer or the processor of the other programmable data processing device generate an apparatus for implementing a specific function in one or more procedures in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may alternatively be loaded onto a computer or another programmable data processing device, so that a series of operations and steps are performed on the computer or the other programmable device, to generate computer-implemented processing. Therefore, the instructions executed on the computer or the other programmable device provide steps for implementing a specific function in one or more procedures in the flowcharts and/or in one or more blocks in the block diagrams.

It is clear that a person skilled in the art can make various modifications and variations to this application without departing from the scope of this application. In this way, this application is intended to cover these modifications and variations of this application, provided that they fall within the scope of the claims of this application and their equivalent technologies.

What is claimed is:

1. A method comprising:

performing, by an internal memory controller, error correction on data at a target location in an internal memory to obtain first corrected data;

writing, by the internal memory controller, the first corrected data into the target location;

reading, by the internal memory controller after performing the error correction on the data at the target location and writing the first corrected data into the target location, first data from the target location;

recording, by the internal memory controller when no error exists in the first data, the target location; and reporting, by the internal memory controller when an error exists in the first data, an error message, wherein the error message indicates that a hardware fault has occurred at the target location.

2. The method of claim 1, further comprising:

performing, by the internal memory controller and before reading the first data from the target location, read isolation configuration on the target location, wherein the read isolation configuration shields a read operation performed on the target location by a component other than the internal memory controller; and canceling, by the internal memory controller and after reading the first data from the target location, the read isolation configuration.

3. The method of claim 1, wherein before performing the error correction on the data at the target location comprises:
reading, by the internal memory controller, second data from the target location based on an indication of a processor;
performing, by the internal memory controller when an error occurs in the second data, error correction on the second data to obtain second corrected data; and
writing the second corrected data into the target location.

4. The method of claim 3, further comprising:
performing, by the internal memory controller and before writing the first data into the target location, write isolation configuration on the target location, wherein the write isolation configuration shields a write operation performed on the target location by a component other than the internal memory controller; and
canceling the write isolation configuration after writing the first data into the target location.

5. The method of claim 1, wherein before reporting the error message, the method further comprises:
performing, by the internal memory controller, error correction on the first data to obtain second corrected data;
writing the second corrected data into the target location again;
reading, by the internal memory controller, the second corrected data from the target location; and
determining that an error exists in the second corrected data.

6. The method of claim 1, wherein reading the first data from the target location comprises reading, by the internal memory controller after performing the error correction on the data at the target location and writing the first corrected data into the target location, only first data from an error bit of the target location, wherein the error bit is an error data location at which the first corrected data is stored in the target location.

7. A device, comprising:
an internal memory comprising a target location; and
an internal memory controller coupled to the internal memory and configured to:
perform error correction on data at the target location to obtain first corrected data;
write the first corrected data into the target location;
read first data from the target location after the internal memory controller writes the first corrected data into the target location;
record, when no error exists in the first data, the target location; and
report an error message when an error exists in the first data, wherein the error message indicates that a hardware fault has occurred at the target location.

8. The device of claim 7, wherein the internal memory controller is further configured to:
perform, before reading the first data from the target location, read isolation configuration on the target location, wherein the read isolation configuration shields a read operation performed on the target location by a component other than the internal memory controller; and
cancel the read isolation configuration after reading the first data from the target location.

9. The device of claim 7, wherein before the internal memory controller is configured to perform the error correction on the data at the target location, the internal memory controller is further configured to:
read second data from the target location based on an indication of a processor;
perform error correction on the second data when an error occurs in the second data to obtain second corrected data; and
write the second corrected data into the target location.

10. The device of claim 9, wherein the internal memory controller is further configured to:
perform, before writing the first data into the target location, write isolation configuration on the target location, wherein the write isolation configuration shields a write operation performed on the target location by a component other than the internal memory controller; and
cancel the write isolation configuration after writing the first data into the target location.

11. The device of claim 9, wherein before the internal memory controller is configured to read the second data from the target location based on the indication of the processor, the internal memory controller is further configured to receive the indication from the processor, wherein the indication comprises a logical address of the second data, and wherein the logical address indicates the target location in the internal memory.

12. The device of claim 7, wherein before the internal memory controller is configured to report the error message, the internal memory controller is further configured to:
perform error correction on the first data to obtain second corrected data;
write the second corrected data into the target location again;
read the second corrected data from the target location; and
determine that an error exists in the second corrected data.

13. The device of claim 7, wherein the internal memory controller is further configured to read the first data from the target location by reading, after performing the error correction on the data at the target location and writing the first corrected data into the target location, only first data from an error bit of the target location, wherein the error bit is an error data location at which the first corrected data is stored in the target location.

14. A computer program product comprising instructions that are stored on a non-transitory computer-readable medium and that, when executed by an internal memory controller, cause a device to:
perform error correction on data at a target location in an internal memory to obtain first corrected data;
write the first corrected data into the target location;
read first data from the target location after the internal memory controller writes the first corrected data into the target location;
record, when no error exists in the first data, the target location; and
report an error message when an error exists in the first data, wherein the error message indicates that a hardware fault has occurred at the target location.

15. The computer program product of claim 14, wherein the instructions, when executed by the internal memory controller, further cause the device to:
perform, before reading the first data from the target location, read isolation configuration on the target location, wherein the read isolation configuration shields a read operation performed on the target location by a component other than the internal memory controller; and cancel the read isolation configuration after reading the first data from the target location.

16. The computer program product of claim 14, wherein before the device is configured to perform the error correction on the data at the target location, the instructions, when executed by the internal memory controller, further cause the device to:

read second data from the target location based on an indication of a processor;

perform error correction on the second data when an error occurs in the second data to obtain second corrected data; and write the second corrected data into the target location.

17. The computer program product of claim 16, wherein the instructions, when executed by the internal memory controller, further cause the device to:

perform, before writing the first data into the target location, write isolation configuration on the target location, wherein the write isolation configuration shields a write operation performed on the target location by a component other than the internal memory controller; and cancel the write isolation configuration after writing the first data into the target location.

18. The computer program product of claim 16, wherein before the device is configured to read the second data from the target location based on the indication of the processor, the instructions, when executed by the internal memory controller, further cause the device to receive the indication from the processor, wherein the indication comprises a logical address of the second data, and wherein the logical address indicates the target location in the internal memory.

19. The computer program product of claim 14, wherein before the device is configured to report the error message, the instructions, when executed by the internal memory controller, further cause the device to:

perform error correction on the first data to obtain second corrected data;

write the second corrected data into the target location again;

read the second corrected data from the target location; and determine that an error exists in the second corrected data.

20. The computer program product of claim 14, wherein the instructions, when executed by the internal memory controller, cause the device to read the first data from the target location by reading, after performing the error correction on the data at the target location and writing the first corrected data into the target location, only first data from an error bit of the target location, wherein the error bit is an error data location at which the first corrected data is stored in the target location.

\* \* \* \* \*